United States Patent [19]

Lauffer

[11] Patent Number: 4,848,532
[45] Date of Patent: Jul. 18, 1989

[54] DEVICE FOR ADVANCING SEVERAL WORKPIECES PLACED SIDE BY SIDE

[75] Inventor: Adelbert Lauffer, Reutlingen, Fed. Rep. of Germany

[73] Assignee: Chr. Eisele Maschinenfabrik GmbH & Co. KG, Kongen, Fed. Rep. of Germany

[21] Appl. No.: 210,668

[22] Filed: Jun. 23, 1988

[30] Foreign Application Priority Data

Jun. 30, 1987 [DE] Fed. Rep. of Germany ....... 3721532

[51] Int. Cl.⁴ .......................... B65G 47/26; B26D 5/20
[52] U.S. Cl. ....................................... 198/456; 83/272; 83/402; 83/416; 83/437; 144/245 R
[58] Field of Search ................. 83/35, 36, 72, 63, 272, 83/282, 402, 416, 437; 198/456; 144/245 R

[56] References Cited

U.S. PATENT DOCUMENTS 4,204,788 5/1980 Massey ............................... 198/456
4,471,866 9/1984 Erdmann et al. ................... 198/456
4,595,092 6/1986 Dyen .................................. 198/456

Primary Examiner—W. Donald Bray
Attorney, Agent, or Firm—John C. Evans

[57] ABSTRACT

In a device for advancing several workpieces placed side by side, a slide comprises several thin plates arranged alongside of one another. These thin plates are positionable against the workpiece end remote from a stop and are movable back and forth over a predetermined compensation distance parallel to the direction of advance of the workpieces. The compensation distance is longer than the greatest difference in length between the workpieces. The thin plates are prestressed by an energy accumulator which exerts a force which is larger than the force required for the advance of the workpieces. A first switch is arranged on the slide to switch off the slide drive as soon as one of the thin plates is displaced beyond the compensation distance in the direction opposite to the direction of advance.

7 Claims, 5 Drawing Sheets

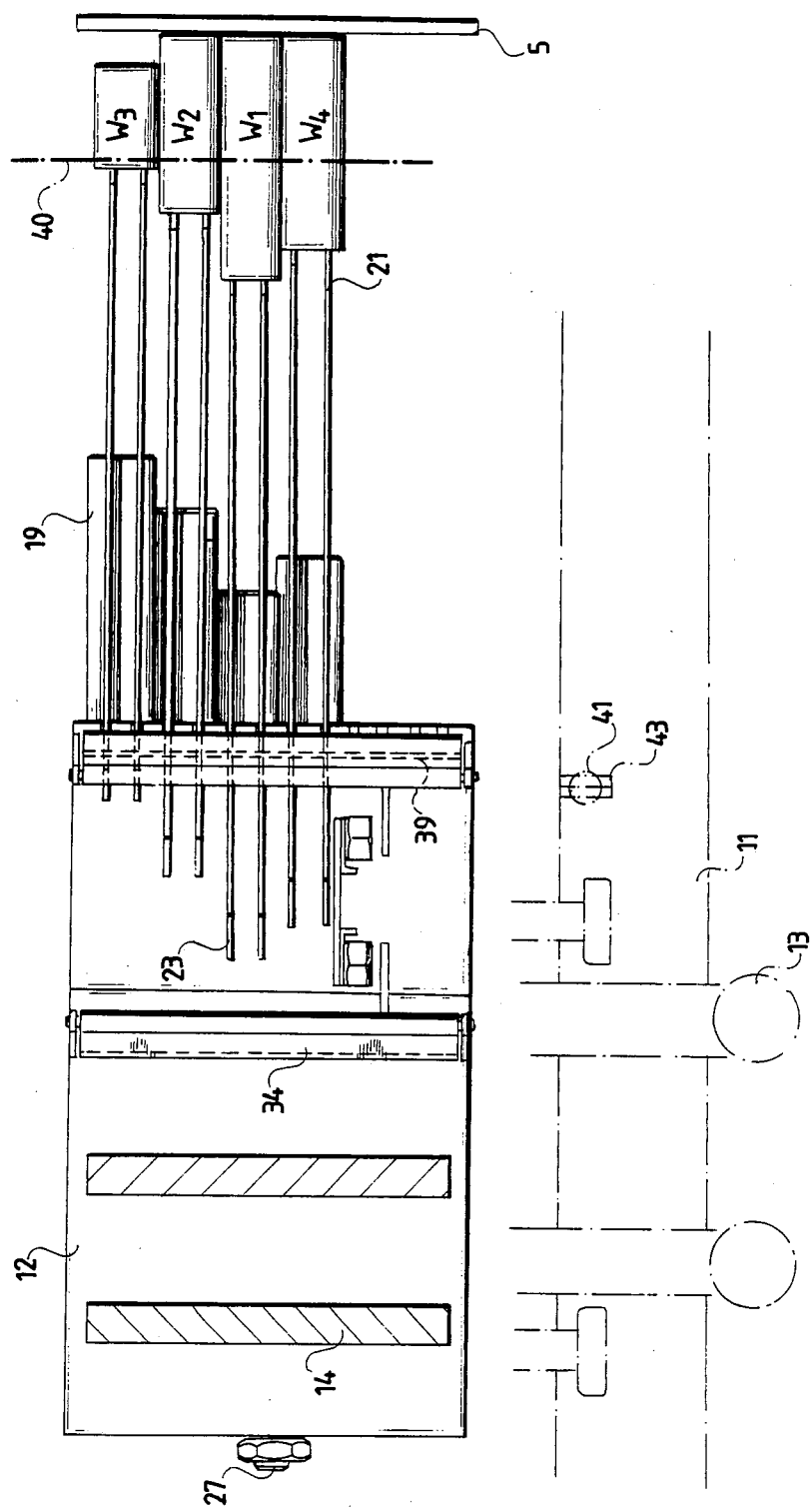

DEVICE FOR ADVANCING SEVERAL WORKPIECES PLACED SIDE BY SIDE

The invention relates to a device for advancing several workpieces of equal or different length placed side by side and for positioning one end of these workpieces against a common stop. The device includes a motor-driven slide which is movable back and forth along a straight-line guide and is positionable against the other workpiece end remote from the stop.

With known devices of this kind, only workpieces of equal length can be advanced because a longer workpiece which has already been placed agianst the stop will prevent the slide from engaging a shorter workpiece and positioning it properly against the stop. In addition, known devices of this kind are often prone to failure when a workpiece is pushed against the stop with excessive force.

The object of the invention is to obviate the shortcomings described above and to improve a device of the generic kind in such a way as to allow workpieces of various lengths to be properly positioned against the stop without destructive forces occurring when the longest workpiece is resting against the stop.

The object is accomplished in accordance with the invention in that the slide comprises several thin plates alongside of one another which are positionable against the workpiece end remote from the stop and which are movable back and forth over a predetermined compensation distance parallel to the direction of advance of the workpieced; in that the compensation distance is longer than the greatest difference in length between the workpieces; in that the thin plates are prestressed in the direction of advance by an energy accumulator and the force exerted by the energy accumulator is larger than the force required to advance the workpieces; and in that a first switch is arranged on the slide to switch off the slide drive as soon as one of the thin plates is displaced beyond the compensation distance in the direction opposite to the direction of advance.

The following description of a preferred embodiment of the invention serves in conjunction with the attached drawings to explain the invention in further detail. In the drawings:

FIG. 5 is a view resembling FIG. 3 in a different operating position.

Figure 1:
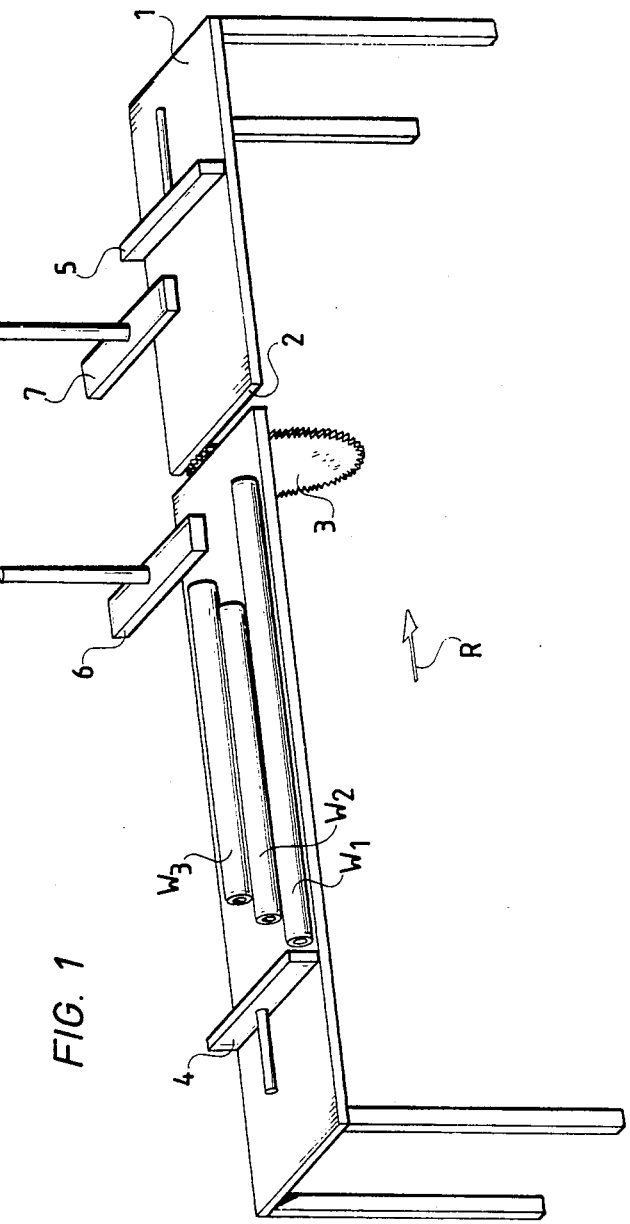
FIG. 1 is a diagrammatic and schematic view of a crosscut saw.

The schematic representation in FIG. 1 serves to explain the basic design and the general mode of operation of a crosscut saw with an advancing device for simultaneously processing several workpieces. A table 1 acting as workpiece support is provided with a slot 2 in which a rotatigly driven circular saw blade 3 can be moved up and down. A number of workpieces W1, W2 and W3 are located side by side on workpiece support 1. These are to be sawn into uniform lengths by the circular saw blade 3. To this end, a slide 4 advances workpieces W in the direction of advance R until their front ends strike a stop 5. The length of the sections to be sawn off is determined by the distance between the stop 5 and the saw blade 3. Two clamping jaws 6, 7 which can be moved up and down in the vertical direction serve to clamp the workpieces during the sawing operation.

As is apparent from the assembly shown in FIG. 1, once the longest workpice W1 contacts stop 5, further advance of slide 4 in the direction of advance R is thereby prevented and, consequently, the shorter workpieces W2, W3 cannot be positioned against stop 5. In addition, excessive forces may occur when the longest workpiece W1 is clamped between stop 5 and slide 4 and the driving motor of slide 4 has not been switched off in time. These forces may even cause the device to be destroyed. The aim of the invention is to obviate these shortcomings.

Figure 2:
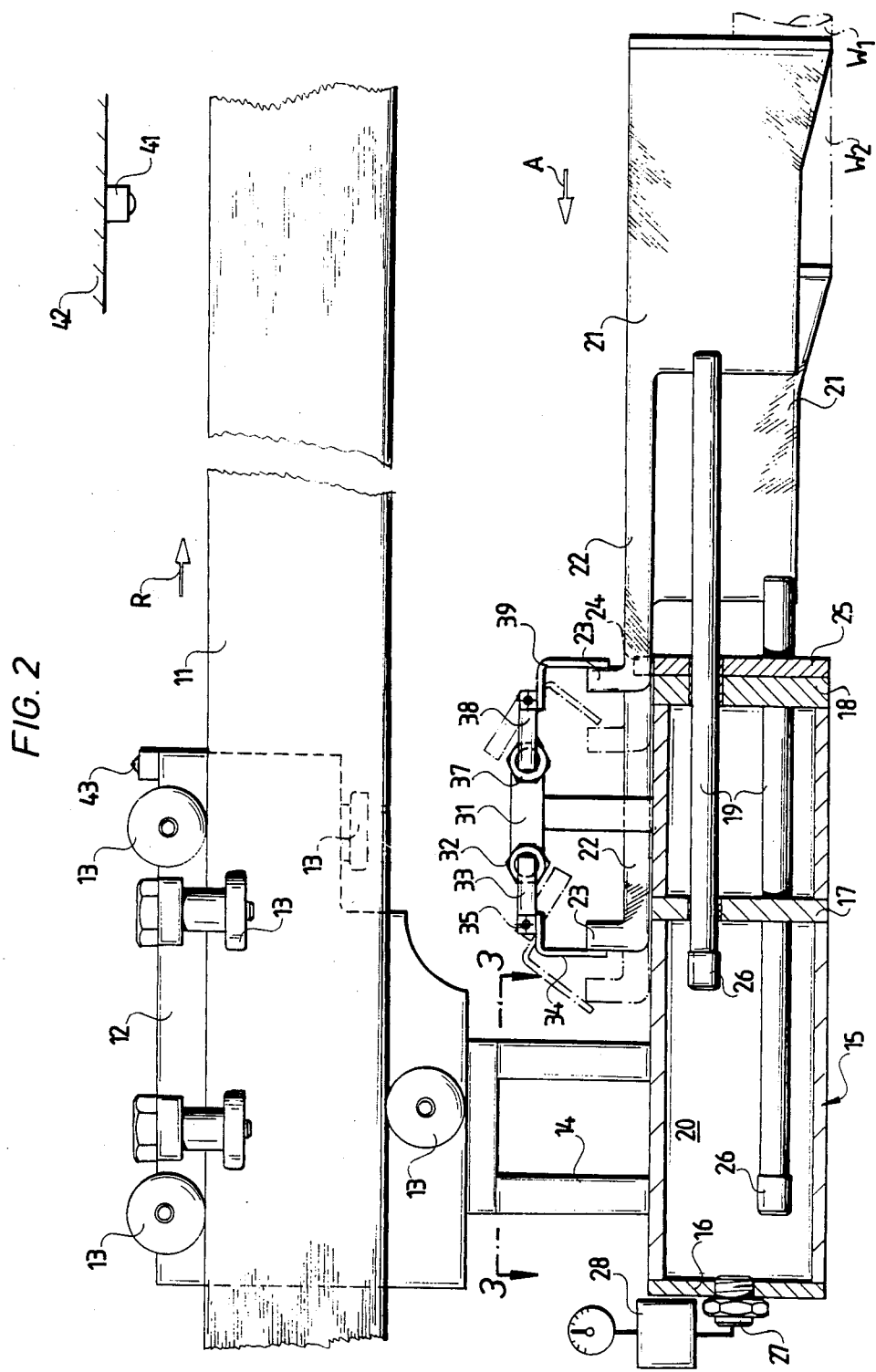
FIG. 2 is a side view of a preferred embodiment of an advancing device.
Figure 3:
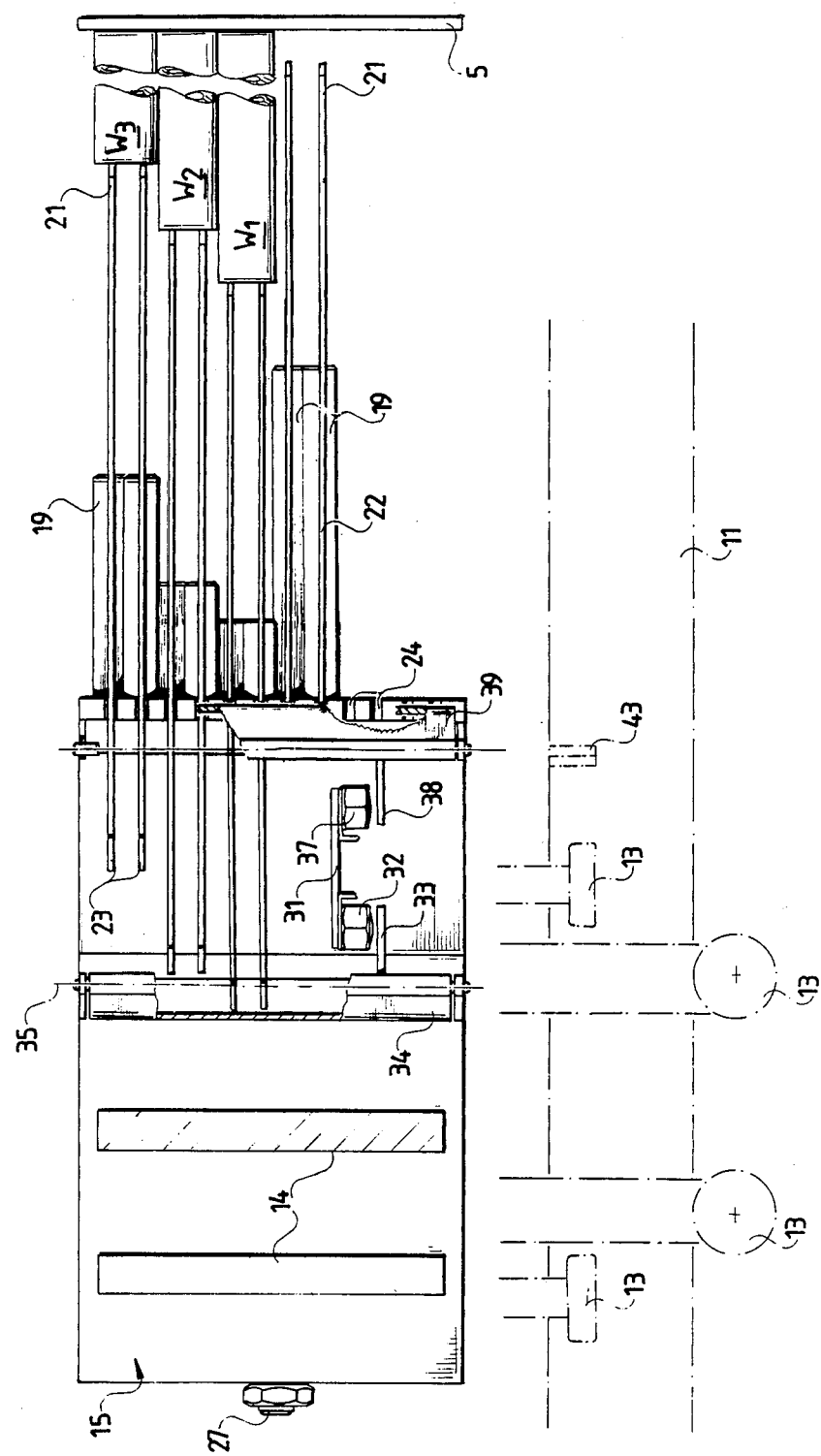
FIG. 3 is a sectional view of the device taken along line 3—3 in FIG. 2.
Figure 4:
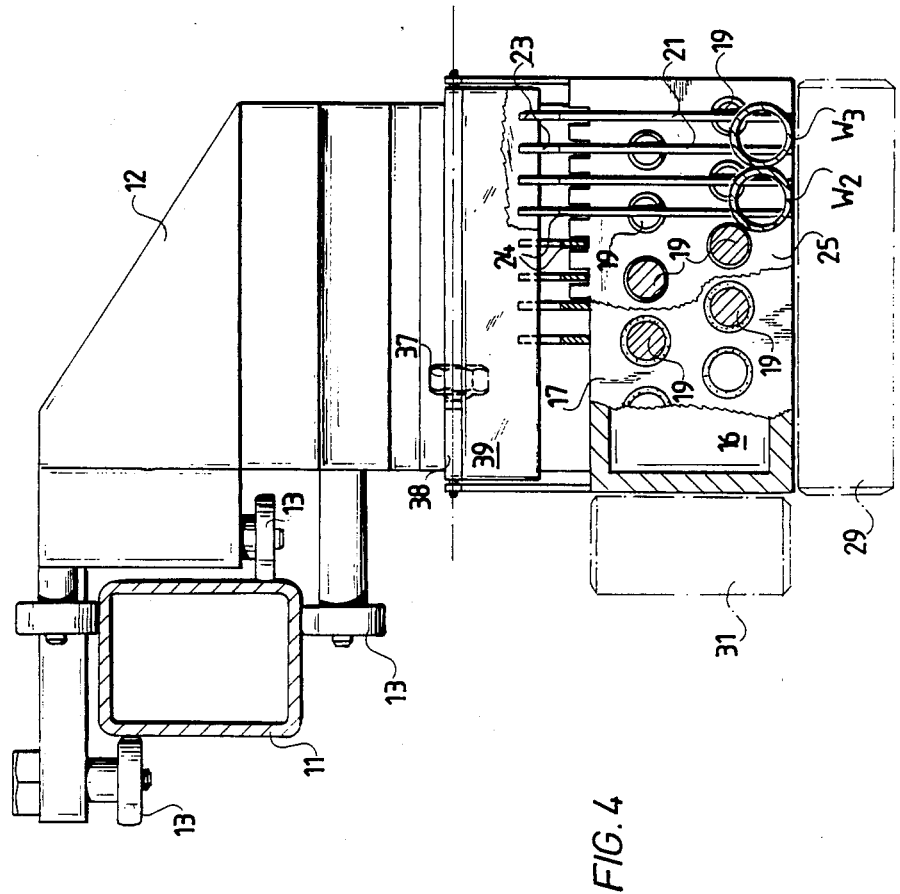
FIG. 4 is a multiple sectional view of the device in the direction of arrow A in FIG. 2.

FIGS. 2, 3 and 4 illustrate a device designed in accordance with the invention for advancing a number of workpieces W1, W2, W3 arranged side by side and for positioning one end of these workpieces against a common stop 5. A slide 12 designed as a movable carriage can move back and forth along a rail 11 acting as a straight-line guide. By means of rollers 13, the slide 12 is guided along rail 11 in the known manner and moved back and forth on this rail by means of a driving motor (not illustrated). The slide 12 is rigidly connected by means of a supporting frame 14 to a hollow casing 15 which consists of a rear wall 16, an internal partition 17 and a front wall 18. In corresponding bores aligned with each other in the internal partition 17 and the front wall 18, bars 19 are pressure responsive members sealingly arranged for sliding displacement in two parallel positions. The ends of these bars 19 extending freely from the casing 15 carry vertically oriented thin plates 21 which are provided with arms 22 pointing in the rearward direction and from which, in turn, short noses 23 protrude in an upward direction. The arms 22 are guided in a slidingly displaceable manner in notches 24 of a plate 25 connected to the front wall 18 (FIG. 4). The rear ends of bars 19 are provided with elastic buffers 26 which allow the bars 19 to strike the rear wall 16 elastically. The space or chamber 20 between the rear wall 16 and the internal partition 17 of casing 15 communicates via a connection piece 27 with a source 28 of gas pressure (schematically represented) supplying a gas at an adjustable, constant pressure. Therefore, the space 20 between the rear wall 16 and the internal partition 17 is permanently under constant gas pressure of a certain value. This pressure which acts on the end portions of the bars within chamber 20 provides a gas spring force that urges the bars to an outermost position with respect to hollow casing 15. The driving motor associated with slide 12 can advance and retract slide 12, casing 15 and the components including the plates 21 mounted thereto. When the buffered rear ends 26 of bars 19 are pushed in, the pressurized gas in space 20, consequently, acts as a pneumatic spring by mneans of which these bars are acted upon by a constant, adjustable counterforce when they penetrate this space.

The workpieces W which are to be advanced by the device (FIGS. 3 and 4) rest on a conventional support, for example, on rollers 29, 31 represented by dot-and-dash lines in FIG. 4. When during displacement of slide 12 in the direction of advance R the front edges of the thin plates 21 strike the end of a workpiece W facing these edges, the respective workpiece is carried along in the direction of advance because the counterforce exerted by the pneumatic spring (space 20) is larger than the advancing force required for transporting the workpiece. Accordingly the bars 19 are in their extended position when the associated workpieces are being displaced toward stop 5. As can be seen from FIGS. 3 and 4, the individual thin plates 21 are spaced at a comparatively small distance from one another so workpieces of small diameter such as, for example, metal pipes, metal bars or the like can also be carried along. Depending on the diameter of the workpieces resting against one another, one or more thin plates 21 may act upon the workpiece and push it forwards.

If, as illustrated in FIG. 3, workpieces of various lengths are to be set against stop 5 and the rear ends of these workpieces are positioned at different distances from slide 12, the respective thin plates 21 engage the workpieces successively and set them in motion in the direction of stop 5. As soon as the front end of the longest workpiece, for example, workpiece W1, strikes stop 5, the thin plates 21 acting upon this workpiece W1 have relative backward movement with respect to the forward direction of advance of the other plates 21 and the ends of bars 19 associated with workpiece W1 penetrate space 20. When the slide 12 advances further in the direction of advance R, further thin plates 21 engage workpiece W2 which is next in size and position it against stop 5, whereupon the respective thin plates 21 likewise move inwardly while the slide 12 continues to move in the direction of advance. The same applies to workpiece W3 and the thin plates 21 acting upon it. As soon as all three workpieces are set against stop 5, but while slide 12 is still travelling in the direction of advance, the thin plates 21 engaging the longest workpiece W1 actuate a switch, in the manner described below, which switches off the drive of slide 12. The clamping jaws 6, 7 mentioned in conjunction with FIG. 1 can then be brought into the operating position and the cut can be performed by saw blade 3.

As shown, in particular, in FIGS. 2 and 3, a noncontacting switch 32, designed, for example, as a reflected light barrier and actuated by a pivotable lug 33, is attached to casing 15 by means of a T-shaped support 31. The lug 33 is rigidly connected to one leg of a flap 34 designed as an angle iron which extends across casing 15 and is pivotable about an axis 35. Owing to its dead weight, the flap 34 normally occupies the position shown in FIG. 2. It could also be prestressed into this position by a spring. When one of the thin plates 21 is pushed backwards to an appropriate extent, the nose 23 provided at the end of arm 22 acts upon the downwardly pointing leg of flap 34 and pivots flap 34, and with it lug 33, in such a manner that switch 32 is actuated and the motor driving the slide 12 is thereby switched off. This switched-off position is indicated in FIG. 2 by dot-and-dash lines. As shown in FIG. 3, this switching off is effected by those thin plates 21 which engage the longest workpiece W1 as these are the first to be pushed back far enough to allow their noses 23 to act upon flap 34 and hence actuate switch 32. If required, the thin plates 21 can be braked definitively by the buffers 26 striking the rear wall 16 of casing 15.

The switch 32 not noly serve to switch the slide drive off in time, but, in addition, functions as a safety switch since by switching off slide 12 in good time it prevents undesirably large forces from being transmitted to the respective workpiece W1 via the thin plates 21 actuating the switch.

After the lengths sawn off from the workpieces by the circular saw blade 3 (FIG. 1) have been removed and the stop 5 is free again, the slide 12 can push the workpieces W forwards by another length. This is preferably effected by the slide 12 first being moved back in the direction opposite to the direction of advance R by a distance that is long enough to allow all of the thin plates 21 to be extended under the action of the pneumatic spring (space 20). Subsequently, displacement of the slide 12 in the direction of advance R causes the thin plates 21 to once again successively engage the workpieces W so these can be set against the stop 5 in the manner described above and another cut can be performed by the saw blade.

It is advisable for the rearward motion of the slide 12 and the displacement of the thin plates 21 into their front end position to be carried out as soon as the workpieces W have struck stop 5 and the clamping jaws 6, 7 have taken up their operating position so the workpieces are not subjected to any more axial pressure exerted by the slide 12 in the direction of advance.

The distance over which the thin plates 21 can be freely displaced owing to the length of space 20 without actuating switch 32 is termed compensation distance. In accordance with the described function, this compensation distance must be longer than the largest difference in length between the workpieces W.

As shown, in particular, in FIG. 2, a second noncontacting switch 37 is arranged on casing 15 and coacts with a pivotable lug 38. In analogy with the lug 33, this lug 38 is attached to a flap 39 also designed as an angle iron. Flap 39 is pivotable about an axis running parallel to axis 35 and likewise extends across the width of casing 15. Owing to its dead weight or to corresponding prestressing by a spring, this flap normally occupies the position represented in FIG. 2 by dot-and-dash lines. As long as at least one of the thin plates 21 is in its fully extended end position (FIG. 2) the nose 23 of this thin plate acts upon the flap 39 in such a manner as to bring it into the position represented by unbroken lines, in which the lug 38 lies in front of switch 37. Only after all of the thin plates 21 have been displaced rearwardly by a certain distance, thereby releasing the flap 39, can it take up the position represented by dot-and-dash lines and cause the switch 37 to issue a command signal.

The second switch 37 coacts with a third switch 41 which is fixedly connected to the machine frame 42. The switch 41 is operated by means of a cam 43 provided on the slide 12. The switch 41 is located close to the saw blade 3. The line along which the workpieces W will be parted by the saw blade 3 is represented by a dot-and-dash line 40 in FIG. 5. The purpose of the two switches 37 and 41 is, on the one hand, to prevent the front edges of thin plates 21 which are not touching workpieces from entering the region of the saw blade 3, and, on the other hand, to identify workpiece remainders that are too short to allow them to be sawn into sections of the desired length.

The two switches 37 and 41 function in the following manner:

If, as shown in FIG. 3, one or more than one of the thin plates 21 is free, i.e., does not encounter a workpiece in its path of advance, they retain their fully extended position throughout the advance of the slide 12 so switch 37 is not actuated. The third switch 41 acts as a limit switch and is interconnected with the second switch 37 in such a way that switch 41 switches off the drive of slide 12 if the second switch 37 has not been triggered simultaneously. The third switch 41 is arranged on the machine frame 42 far enough from the parting line 40 to be operated by the cam 43 before the front edge of the fully extended thin plates 21 has reached the parting line 40. Identification of the workpiece remainders is carried out in a similar manner. As shown in FIG. 5, the workpieces W1, W2 and W4 have already been set against the stop 5 by the thin plates 21 engaging them. The shortest workpiece W3 has, however, not yet reached the stop 5 so the thin plates acting upon this workpiece W3 are still fully extended and, consequently, retain the flap 39 in the position represented in FIG. 2, in which the second switch 37 is not actuated. However, since the slide 12 in FIG. 5 has already reached a position in which the cam 43 has actuated switch 41, the two prerequisites for switching off the drive of slide 12 have been met. In this case, all of the workpieces W have to be removed and new longer workpieces inserted after the slide 12 has been driven back sufficiently far.

In another modified embodiment, not illustrated, the described device can be controlled in such a manner that, for example, when a first workpiece is positioned against the stop 5, the remaining workpieces advance up to the point at which the first switch 32 is actuated, is effected at "creep speed", i.e., at a substantially slower speed of advance of the slide 12. This can be achieved, for example, by means of a further switch which is allocated to stop 5 and which responds as soon as a workpiece strikes the stop. In this case, the stop 5 can be retracted a short distance from its setpoint position in order to subsequently return to this setpoint position.

In a further modified embodiment of the described device, a sensing and measuring device for the identification and measurement of the shortest workpiece length is provided on the slide, for if more than one specified length is to be sawn off successively from several workpieces at the same time, the number of lengths that it is possible to saw off from each workpiece naturally depends on the shortest workpiece. Accordingly, if its length is known, the number of sections obtainable can be ascertained at the beginning of the sawing operation. For the identification and measurement of the shortest workpiece it is possible, for example, to determine the respective distance between the slide 12 and the stop 5 by means of conventional devices for linear measurement and, at the same time, when the position illustrated in FIG. 3 has been reached, to establish the relative displacement of the thin plates 21 acting upon the shortest workpiece W3 in relation to the casing 15. The length of the shortest workpiece can then be determined from these distances and from the absolute position of the casing 15.

The present disclosure relates to the subject matter disclosed in German Application No. P 37 21 532.9 of June 30, 1987, the entire specification of which is incorporated herein by reference.

What is claimed is:

1. Device for moving separate elongated workpieces of equal or different lengths placed side by side on a support in a direction of advance to position one end of each of these workpieces against a stop, said device comprising a guide, a motor, slide means drivingly connected to said motor for movement thereby back and forth along said guide and contact means carried by said slide means positionable against the ends of said workpieces remote from said stop, characterized in that said contact means of said slide means (12) comprises a plurality of separate workpiece contact plates (21) arranged along-side of one another, means adjustably mounting said plates for movement relative to the body of said slide for operative contact against the ends of said workpieces remote from said stop (5) as said slide moves toward said stop and for movement back and forth over a predetermined compensation distance parallel to said direction of advance of said workpieces (W); said compensation distance being longer than the greatest difference in length between said workpieces (W); an energy accumulator means (20) for applying a spring force to said plates (21) in said direction of advance and said spring force exerted by said energy accumulator being greater than the force required to advance said workpiece (W) toward said stop; first switch mean (32) for controlling the operation of said motor arranged on said slide (12, 15) and conditionable to terminate the operation of said motor and the drive of said slide means as soon as one of said plates (21) is displaced beyond the compenstion distance in the direction opposite to said direction of advance.

2. Device as defined in claim 1, characterized in that a second switch means (37) is arranged on said slide (12, 15), said second switch means being triggered to terminate operation of said motor by actin of said plates (21) when all of said plates (21) are displaced from an outer and initial position in a direction opposite to said direction of advance.

3. Device as defined in claim 2, characterized in that third switch means (41) is fixed at a limit position and at a predetermined distance from an initial position of said slide, said third switch means being triggered by said slide means (12, 15) when said slide means has reached said limit position to termintae operation of said motor and movement of said slide means.

4. Device as defined in claim 1, characterized in that said second and third switch means provides means for identification and measurement of the length of the shortest of said workpieces (W3).

5. Device as defined in claim 1, characterized in that said energy accumulator is a pneumatic spring (20).

6. Device as defined in claim 5, characterized in that the pressure of said pneumatic spring (20) is adjustable as a function of the force required to advance the workpieces.

7. Device as defined in claims 1 or 2, characterized in that first and second flap means (34, 39) extending transversely to the direction of displacement of said plates (21) are operatively mounted on said slide means for respectively switching said first and second switch means, means (23) protruding from said plates means for contacting and displacing said flap means to effect actuation of said switch means.

* * * * *